United States Patent [19]

Ekdahl et al.

[11] Patent Number: 4,842,906
[45] Date of Patent: Jun. 27, 1989

[54] PACKING LAMINATE FOR THE MANUFACTURE OF LIQUID-TIGHT PACKING CONTAINERS AND USE OF SUCH LAMINATE

[75] Inventors: Gert Ekdahl, Helsingborg; Tommy Nyström, Lund, both of Sweden

[73] Assignee: AB Tetra Pak, Lund, Sweden

[21] Appl. No.: 69,484

[22] Filed: Jul. 2, 1987

[30] Foreign Application Priority Data

Jul. 4, 1986 [SE] Sweden .................... 8602985

[51] Int. Cl.⁴ .................. B32B 23/08; B32B 27/10; B65D 65/40
[52] U.S. Cl. ..................... 428/34.2; 428/328; 428/340; 428/513; 206/621.2; 222/529; 229/3.1; 229/3.5 R; 427/42
[58] Field of Search ............ 428/35, 328, 340, 513

[56] References Cited

FOREIGN PATENT DOCUMENTS 262978 10/1964 Austria ............................. 428/513
0011274 5/1980 European Pat. Off. ........... 428/513
2108555 2/1971 Fed. Rep. of Germany ...... 428/513

Primary Examiner—P. C. Ives
Attorney, Agent, or Firm—Burns, Doane, Swecker & Mathis

[57] ABSTRACT

A packing laminate for the manufacture of packing containers for liquid contents, including an inner layer (5) of fibrous material with outer layers (6) and (7) of liquid-tight material and a color layer (8) with the object of creating a decoration or similar identification marking on the finished container. The color layer (8) is hardened through electron irradiation and in order to protect the inner layer (5) from the effect of this irradiation the laminate comprises a layer (14) applied between the inner layer (5) and the color carrying plastic layer of a material capable of absorbing electrons during the irradiation.

6 Claims, 2 Drawing Sheets

PACKING LAMINATE FOR THE MANUFACTURE OF LIQUID-TIGHT PACKING CONTAINERS AND USE OF SUCH LAMINATE

FIELD OF THE INVENTION

The present invention relates to a packing laminate intended for the manufacture of liquid-tight packing containers as well as to the use of such a packing laminate for the manufacture of packing containers for liquid contents, e.g. milk, and a packing container manufactured from the packing laminate.

BACKGROUND OF THE INVENTION

Within the technique of packaging, non-returnable packages have been used for a long time which are manufactured from a packing laminate which consists of one or more carrier layers of paper or cardboard together with outer and inner coatings of thermoplastics, such as polyethylene. Frequently, the packing laminate in these so-called non-returnable packages is provided with a further layer of some other material, e.g. aluminium foil or plastic layers other than those mentioned here.

The composition of the packing laminate is designed to produce the best possible product protection for the goods which are to be packaged, as well as offering simple and convenient handling to the consumer. To achieve mechanical rigidity which, on the one hand, provides mechanical protection for the contents and, on the other hand, renders the package sufficiently form-stable so that it can be handled without any difficulty and gripped by hand, the packages of this type frequently are provided with a carrier layer of paper or cardboard which imparts rigidity of form and mechanical strength to the package. However, such a carrier layer possesses no tightness properties for gases or liquids, and the proper rigidity of the material disappears when the same is exposed to moisture or liquid which is absorbed into the material. In order to impart good liquid-tightness to the material, it is frequently laminated with a plastic material, and if this is thermoplastic (e.g. polyethylene) it may be used moreover, for sealing plastic layers to one another with the help of heat and pressure (so-called hot-sealing) and in this manner the packing container can be sealed and made permanent in its given form in that overlapping material panels, which are thermoplastic-coated, are heat-sealed to each other in a tight and mechanically strong seal.

Packing containers of the type mentioned here are usually manufactured either from blanks punched out beforehand or from a continuous web which has been prepared with suitable decoration of advertising and/or informative character and with a pattern of crease lines facilitating the fold-forming. Packing containers are made from such a web in that longitudinal edges of the web are joined to each other in an overlap joint so as to form a tube which subsequently is filled with the intended contents and is divided into individual, closed packing containers through repeated transverse sealings of the tube at right angles to the longitudinal axis of the tube. After suitable fold-forming of the packing material in the tube the material in the said packing containers is converted to the desired geometrical form, usually a parallelepiped, by providing the tube with longitudinal folding lines and with double-walled triangular folding lugs at the corners of the packing container. As an example of a known parallelepipedic packing container may be mentioned Tetra Brik (registered trademark) for the packaging of primarily liquid or semiliquid dairy products, e.g. milk, but also other types of beverages such as juice.

In view of the very strong growing market for non-returnable packing containers, there has been an unavoidable call (not least from the side of the consumer) for providing the packing containers with some type of visual identification mark in the form, for example, of colored patterns with some associated text and/or figures in order to distinguish a certain container from "rather similar" other containers and also for a clear indication of quality, date of packaging, keeping property etc. of the packed product. Such an advertising and/or information marking of packing containers is realized mainly in connection with the manufacture of the packing laminate and may be done, for example, in that a laminate web of continuous packing container blanks, plastics-coated on both sides and provided with crease lines, is introduced between and through the nip of rollers rotating in pairs close to each other, whereof one serves as an inking roller and consequently applies printing ink onto one side of the web according to a pattern corresponding to the desired marking on the finished package while the other roller in each such pair of rollers acts as a counter-pressure roller against the other side of the web passing by in accordance with conventional printing technique, whereupon the printed web is either rolled up into finished rolls or is divided up into individual packing container blanks for further transport to a packing machine for forming, filling and closing of the packing containers. Since this printing of decorations or patterns in printing plants usually takes place at very high production capacities, it is frequently an essential requirement that the printing ink composition used should be of a type to make possible a production-adapted rapid drying or hardening of the web before the web is rolled up or divided up into individual container blanks. This requirement is met satisfactorily by the known EB-hardenable (electron beam) printing ink compositions which contain monomers and/or oligomers hardenable by electron irradiation, and in the case of which a practically instantaneous "drying" (hardening) is possible by exposing the printed side of the web to electron irradiation of sufficient intensity. Among the merits of the method may also be counted the exceptionally good wear resistance of the hardened color layer which is obtained and which is a result of the hardening reaction initiated through electron irradiation of the printing ink composition applied. However such a printing method with electron irradiation in the form it is carried out at present is not entirely meritorious, but in fact has disadvantages too which, at least in parts, are assumed to be due to undesirable irradiation effects and which as a further consequence bring about impaired tightness properties of packing containers manufactured from such a decoration-printed packing laminate. Without being committed to any particular scientific theory, it is reasonable to assume that the irradiating electrons, in order to initiate the hardening action, must have allocated to them such energy that they thereby become sufficiently energetic to penetrate through the outer irradiated plastic layer and down into the underlying fiber layer, with a certain molecular degradation and/or structural alteration in that layer as a consequence. Thus, it has been found that moisture-repellent properties of a paper layer included in a known packing laminate so irradiated are drastically impaired, and that, as a result thereof, the packing laminate has become more moisture-sensitive and, consequently, less suitable for the manufacture of packing containers for liquid contents.

OBJECTS AND SUMMARY OF THE INVENTION

This disadvantage has been overcome in accordance with the present invention with the help of a packing laminate which beside the layers of fibrous material and color-carrying plastics mentioned here has been provided, moreover, with a coating located between these layers with the properties particularly pointed out in claim 1. Comparative tests have shown, in fact, that liquid-filled packing containers manufactured from such a packing laminate possess a smaller tendency towards absorbing liquid into the packing material than comparable packing containers which had been manufactured from packing laminate according to known techniques. This, against the background of the earlier assumption, must be interpreted to mean that the extra coating of the packing laminate in accordance with the invention protects the underlying fiber layer against penetration of electrons affecting the structure in connection with the electron irradiation of the packing laminate during the color printing. Specially suitable embodiments of such a packing laminate within the scope of the general inventive concept defined in claim 1 possess the characteristics specified more closely in the dependent claims.

BRIEF DESCRIPTION OF THE DRAWING

The invention will now be described in more detail with reference to the attached drawing, wherein.

DETAILED DESCRIPTION OF A PREFERRED EMBODIMENT

Figure 1:
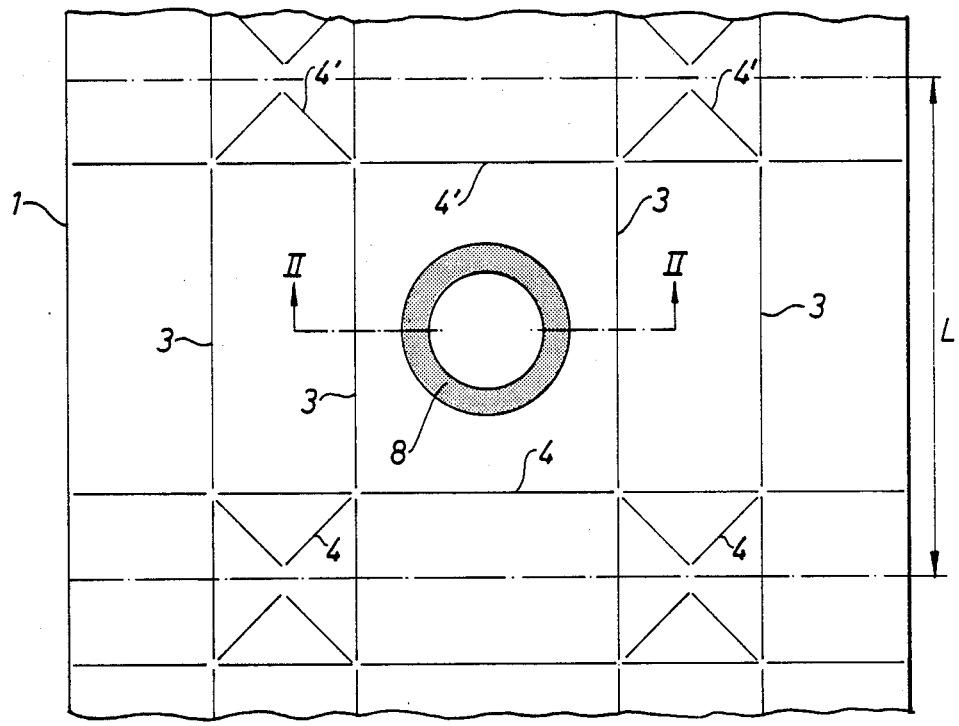
FIG. 1 is a plan view of a web of packing laminate in accordance with the invention.
Figure 3:
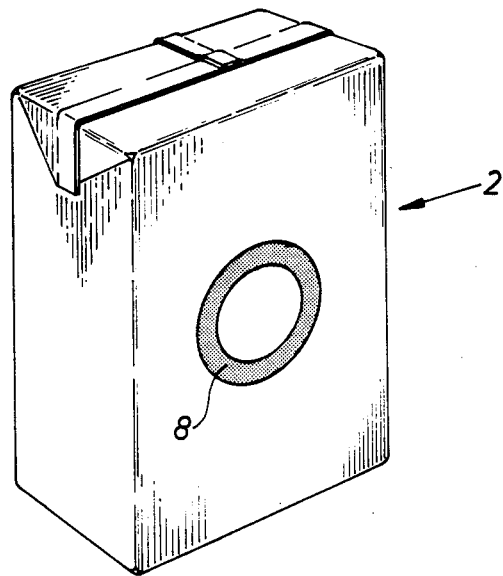
FIG. 3 is a perspective view of a packing container which has been manufactured from a packing laminate according to FIG. 1.

In FIG. 1 is thus shown a part of a web 1 of continuous container blanks L for the manufacture of filled, closed packing containers of the type which are manufactured in a packing machine through folding and sealing of the longitudinal edges of the web to form a tube which is filled with the desired contents, and subsequently is divided into individual, closed packing containers through repeated transverse sealing and cutting in the transversely sealed region. Such a known packing container is shown in FIG. 3, with the general reference designation 2, which is generally known under the name Tetra Brik (registered trade-mark).

To facilitate the conversion of the packing material 1 to packing containers 2 of the parallelepipedic shape shown the packing material 1 may be provided with a number of longitudinally extending folding lines 3 (or so-called crease lines) and a corresponding number of transversely extending folding lines 4,4' intended for facilitating the formation of the bottom and top closure respectively of the container.

Figure 2:
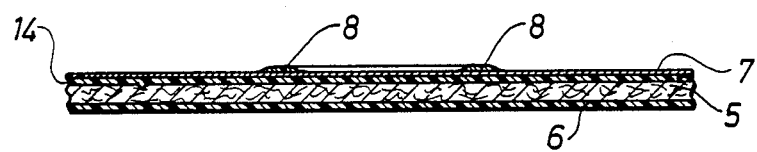
FIG. 2 is a schematic cross-sectional view of the packing laminate in FIG. 1 along the line II—II.

The packing material 1 may be made up of several layers laminated to one another whose number and composition may vary depending on the type of contents which are to be packed. In the example shown here it is assumed that the packing material 1 is intended for the manufacture of packing containers for the filling of liquid contents, e.g. milk, and comprises, therefore, in analogy to known packing material an inner base layer 5 of rigid fibrous material, e.g. paper or cardboard with outer layers 6 and 7 respectively of liquid-tight material, e.g. plastics such as polyethylene, (FIG. 2). The packing material 1, furthermore, comprises an outer color layer of the type which is applied in a previously determined pattern and which is hardened or dried through electron irradiation with the object of creating a permanent identification symbol or decoration on the finished container 2, as mentioned previously.

EB-hardenable (electron beam) printing ink compositions are known to those versed in the art and, therefore, need hardly be described more closely here, but such applicable ink compositions typically contain monomers and/or oligomers of the type which undergo a practically instantaneous "drying" (hardening) on exposure to electron irradiation of sufficient strength, e.g. up to 10Mrad. A typical practical irradiation dose may be 3 Mrad.

Figure 4:
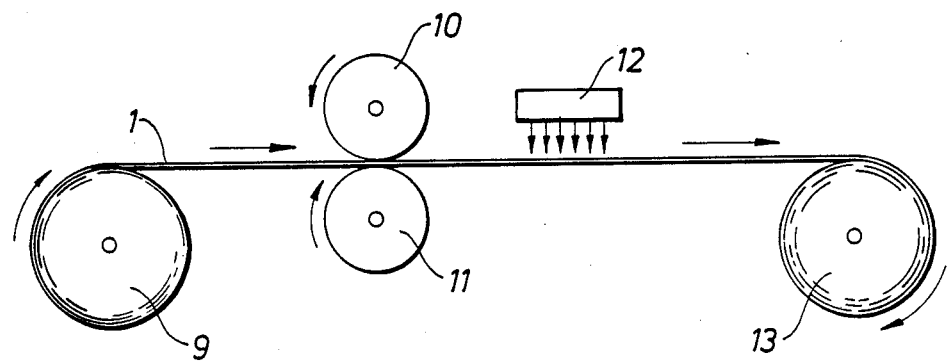
FIG. 4 is a schematic view of a printing method, known in itself, for the decoration of a packing laminate in accordance with the invention.

In accordance with conventional techniques, the color layer 8 is applied to the packing material usually by so-called offset-printing using the arrangement shown schematically in FIG. 4. The packing material 1 to this end is wound off a roll 9 and is passed through the nip between two rollers 10 and 11 rotating closely to each other, whereof one roller 10 transfers printing ink on its surface from an ink bath (not shown) to one side of the packing material 1, while the second roller 11 serves as a counter-pressure roller. Owing to the surface of the roller 10 being provided with surface portions arranged in the desired pattern of alternatingly ink-receptive and ink-repelling character respectively, it becomes possible thereby reproducibly to transfer the surface pattern, thus inked on the surface of the roller 10 onto the one side of the packing material 1 passing by. Subsequently the packing material 1 is conducted further past a radiation source 12 which emits electron beams of the desired intensity (e.g. 3Mrad) in the direction of the color-coated side of the packing material 1, as a result of which a practically instantaneous hardening of the printing ink composition applied is achieved to form a permanent color pattern. Finally the packing material 1 is wound up on a roll 13 for further transport and feed into a packing machine for the manufacture of packing containers 2.

As mentioned earlier, the printing method described, when applied to packing material of conventional type, has been subject to certain disadvantages which are assumed to be due to material so irradiated undergoing structural changes, especially the inner fibrous base layer, through the effect of penetrating electrons and which, among other things, leads to the quality characteristics of the packing material being impaired. In particular it has been found that the sensitivity to moisture of the packing material had increased, which signified that the packing material after such an irradiation treatment possessed a higher moisture absorption than before the treatment and this considerably impaired the usability of the packing material for the manufacture of packing containers for liquid contents.

In accordance with the present invention, however, it has been found that this inconvenience of the known technique can be eliminated in a simple manner by providing the packing material with a further layer 14 (FIG. 2) located between the inner fibrous base layer 5 and the outer liquid-tight layer 7 onto which the color layer 8 is to be applied. To this end, the layer 14 is to be constituted of a material capable of absorbing electrons for the hardening of the color composition applied directed toward the color-carrying plastic layer 7, and in accordance with the invention such a material layer may consist of a mixture of binder and pigment. As examples of binders may be mentioned styrene-butadiene polymers, polyvinyl acrylate, polyvinyl acetate and starch, each by itself or in combination with one another, while the pigment may be constituted of kaolin (china clay), calcium carbonate and titanium dioxide, each by itself or in suitable mutual combinations. A suitable mixture of this kind may be, for example, an aqueous dispersion of 12% binder containing styrene-butadiene polymer, polyvinyl acetate and starch and 76% pigment containing china clay, titanium dioxide and calcium carbonate. The thickness of the layer 14 used shall be sufficient to absorb electron beams of a density of up to 10Mrad, normally used in hardening EB-hardenable printing ink compositions, and in accordance with the invention it has been found that layer thicknesses of over 5 g/m², such as preferably between 10 and 30 g/m², satisfactorily meet this requirement.

A packing material 1 in accordance with the invention of the type as illustrated in FIG. 2 may be manufactured, for example, in that a web of fibrous material, e.g. paper, provided with folding lines 3, 4, 4', has an aqueous dispersion of binder and pigment of the type mentioned here applied to one side in a quantity corresponding to a dry weight of over 5 g/m², e.g. 10–30 g/m², and is coated subsequently on both sides with extruded plastic films to form the liquid-tight layers 6 and 7. The procedure followed for application of the color decoration 8 is in accordance with the method described above with reference to FIG. 4.

In a practical test a packing laminate in accordance with the present invention was compared with corresponding known packing laminates to find out the effect on properties of the hardening through electron irradiation in the manner as described above. As a reference property the so-called edge imbibition (g/m.h.) of the respective laminate before and after the said irradiation was chosen.

The reference solution consisted of 1 percent lactic acid of 23° C. wherein cut up slices of the laminate in a quantity corresponding to 1 meter laminate edge length were kept submerged, whereafter the weight increase (quantity of liquid imbibed) was determined and compared with the corresponding weight increase which was obtained with the same quantity of slices cut from non-irradiated laminate. The packing laminate in this test in all cases contained cardboard of Duplex quality, the laminate in the first case being without a protective layer, in the second case containing pigment and in the third case being provided with a protective layer, 15 g/m², in accordance with the invention. The results of the test are presented in the following Table:

| Cardboard quality | Edge imbibition g/m.h. | |
| --- | --- | --- |
| | before | after |
| Duplex | 0.33 | 0.49 |
| Duplex (with pihgment) | 0.11 | 0.45 |
| Duplex (layer according to invention) | 0.15 | 0.15 |

It is evident from the Table that the liquid absorption of the two known packing materials increased strongly after electron irradiation, while the liquid absorption of the packing material in accordance with the invention was wholly unaffected.

While this invention has been illustrated and described in accordance with a preferred embodiment, it is recognized that variations and changes may be made and equivalents employed herein without departing from the invention as set forth in the claims.

What is claimed is:

1. A packing laminate for use in the manufacture of liquid-tight packing containers, comprising:
    at least one layer of fibrous material having outer layers of plastic material and including a color layer on one of the plastic layers, the color layer being hardenable through electron irradiation; and
    a coating arranged between the at least one fibrous layer and the outer layer upon which the color layer is provided, the coating comprising a material capable of absorbing electrons for the hardening of the color layer which are directed towards the outer layer upon which the color layer is provided.

2. A packing laminate in accordance with claim 1, wherein the coating includes a mixture of binder and pigment.

3. A packing laminate in accordance with claim 2, wherein the binder is chosen from the group including styrene-butadiene polymer, polyvinyl acrylate, polyvinyl acetate and starch or combinations thereof, and the pigment is chosen from the group including kaolin, calcium carbonate and titanium dioxide or combinations thereof.

4. A packing laminate in accordance with claim 1, wherein the coating is used in a quantity of at least 5 g/m² fiber layer.

5. A packing laminate in accordance with claim 4, wherein the coating is applied to the fiber layer in the form of an aqueous dispersion carrying up to 12 percent by weight binder and up to 76 percent by weight pigment.

6. A packing container for liquid contents, comprising:
    a packing laminate having at least one layer of fibrous material with outer layers of plastic material, a layer of color material hardenable through electron irradiation provided on one of the outer layers, and a coating located between the fibrous layer and the outer layer on which the layer of color material is provided, the coating comprising a material capable of absorbing electrons used for hardening the color layer and directed toward the outer layer on which the layer of color material is provided.

* * * * *